United States Patent [19]

Killian, Jr. et al.

[11] 4,057,816
[45] Nov. 8, 1977

[54] ACCESSORY ADAPTER

[75] Inventors: John C. Killian, Jr., Sudbury; John B. Morse, Boston, both of Mass.

[73] Assignee: Polaroid Corporation, Cambridge, Mass.

[21] Appl. No.: 648,724

[22] Filed: Jan. 13, 1976

[51] Int. Cl.² ............... F16M 11/04; G03B 17/00
[52] U.S. Cl. ............................. 354/293; 248/187; 354/295
[58] Field of Search ............... 248/187; 354/293, 295, 354/81

[56] References Cited

U.S. PATENT DOCUMENTS

| 2,840,334 | 6/1958 | Cauthen | 248/187 |
| 3,356,325 | 12/1967 | Schnase | 354/293 X |
| 3,563,154 | 2/1971 | Henning | 248/187 |
| 3,833,916 | 9/1974 | Van Der Meer | 354/293 |

Primary Examiner—John Gonzales
Attorney, Agent, or Firm—John S. Vale

[57] ABSTRACT

An adapter for connecting a camera not provided with a tripod socket to a tripod. The adapter comprises a housing, a threaded insert for receiving a tripod screw in the housing, and a dovetail shoe adapted to fit a cooperating dovetail slot in the camera bottom. The dovetail shoe is formed with an opening in which there is a brake assembly movable by a manually operable lever between locked and unlocked positions.

4 Claims, 40 Drawing Figures

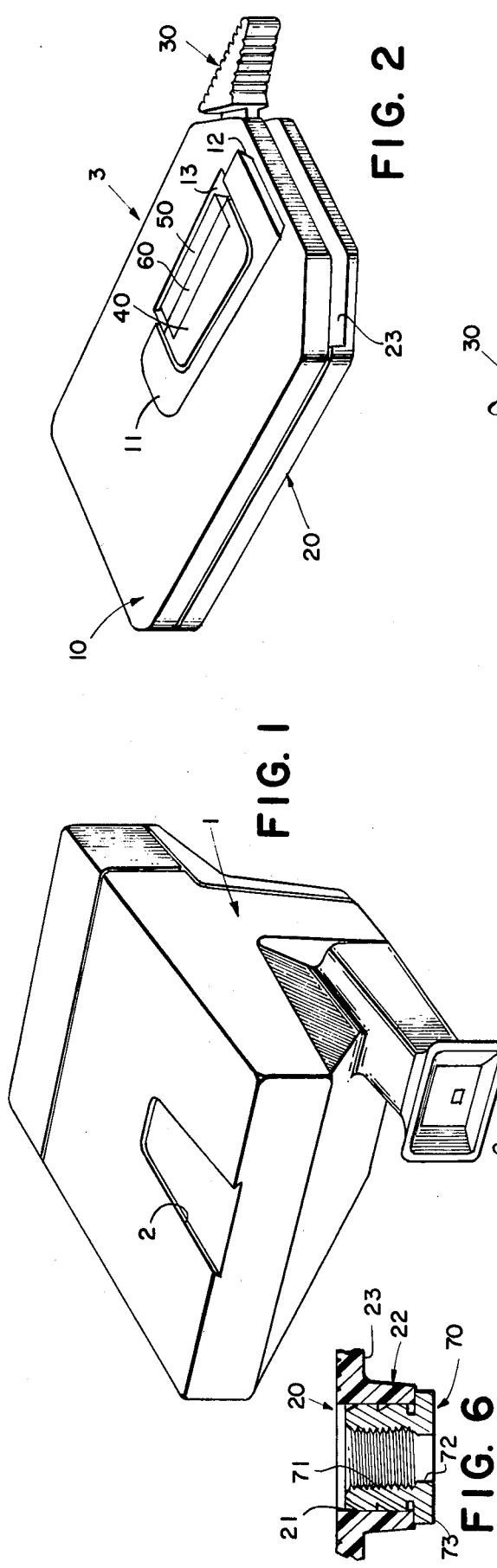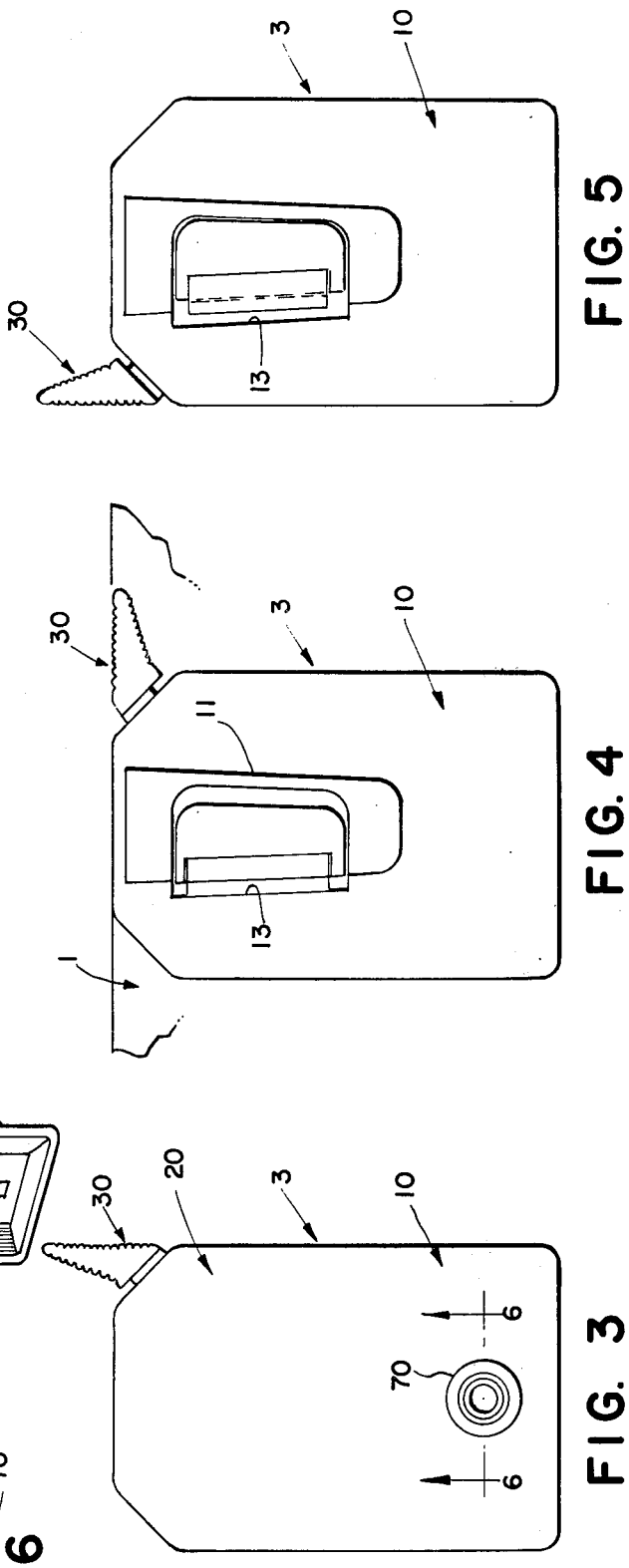

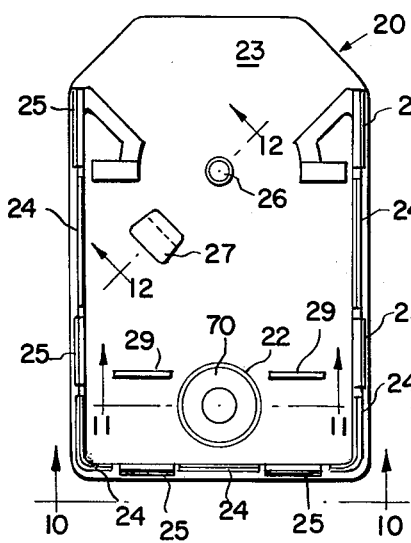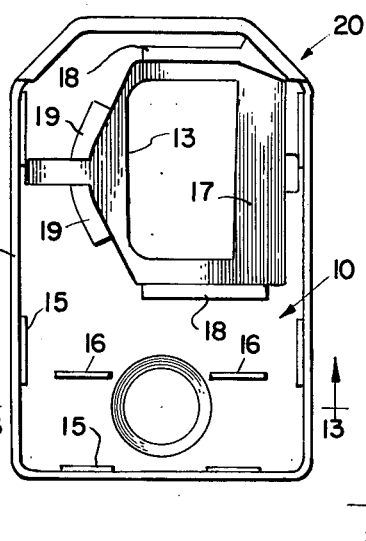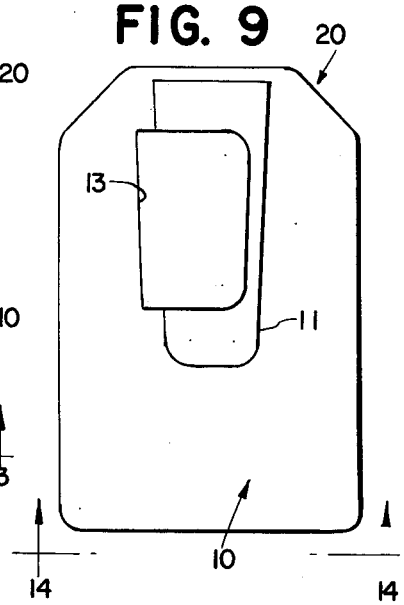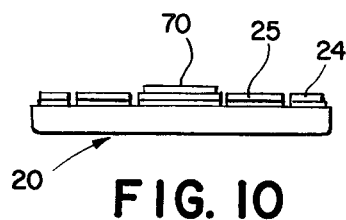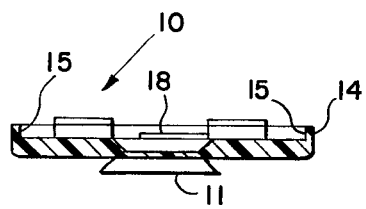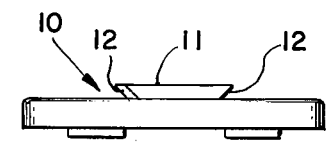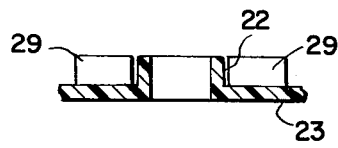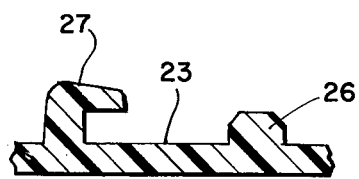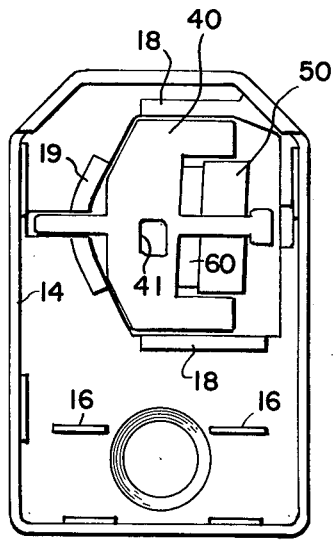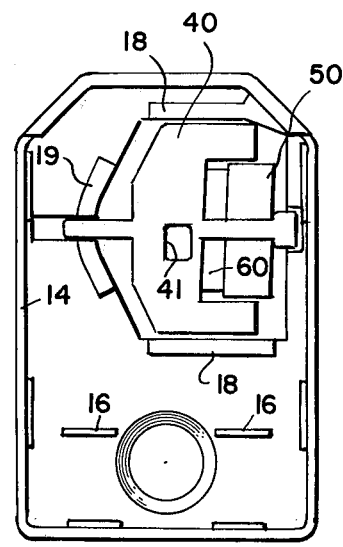

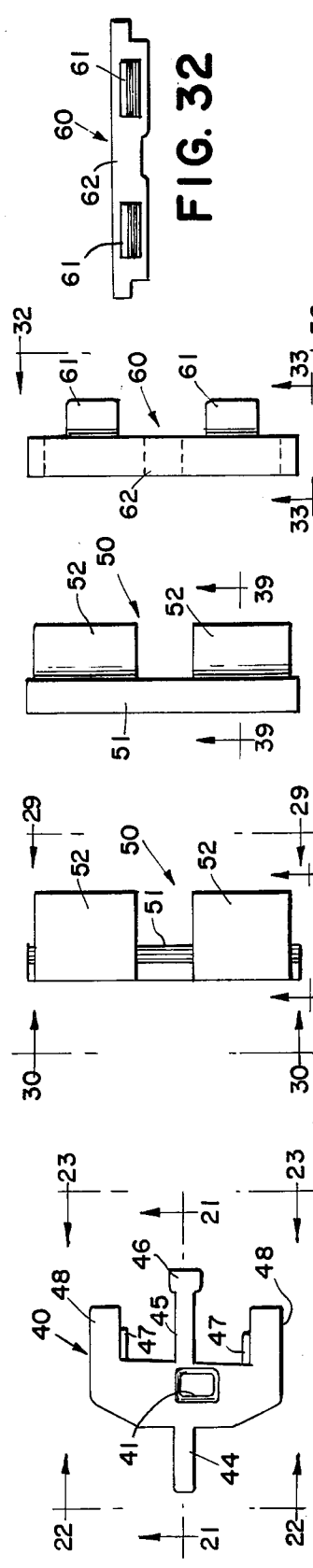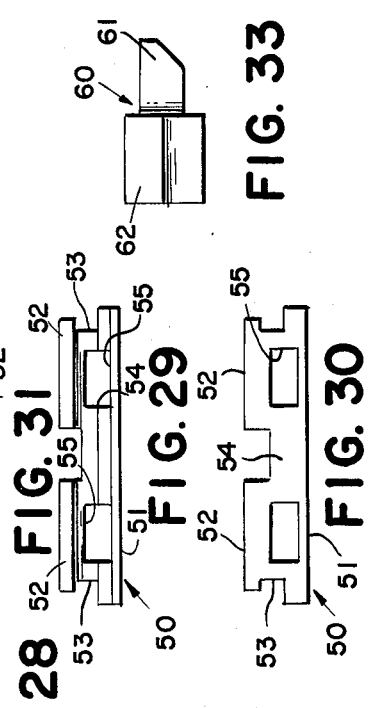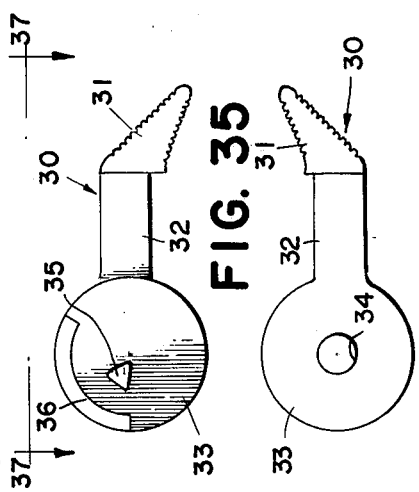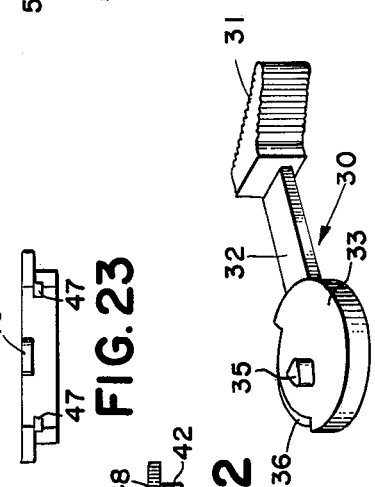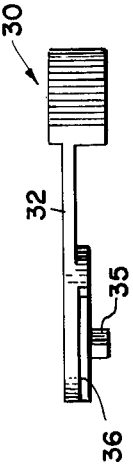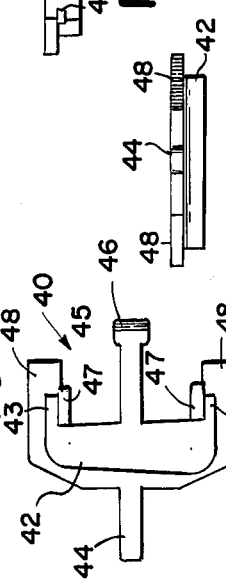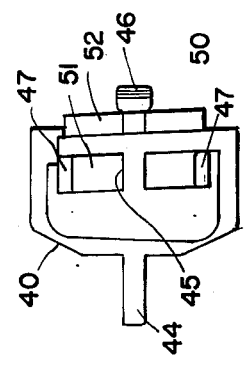

ACCESSORY ADAPTER

This invention relates to photographic apparatus and particularly to a novel accessory mounting device.

It is conventional to provide cameras of almost every description with a tripod socket in the base. The tripod socket, initially designed to mount the camera on a tripod, is also commonly used as a point of attachment for accessories such as a flash gun or the like.

Unless the tripod socket can be formed as a threaded bore in an existing metal part, as in the base plate of a conventional 35mm camera or the like, its inclusion in the camera represents an increase in bulk and weight. A number of cameras have accordingly been developed which achieve greater compactness and lightness in weight by the omission of the tripod socket.

Cameras without a tripod socket require an adapter if they are to be used on a tripod or with accessories incorporating a tripod screw. Such cameras, and various adapters therefor, are shown and described in U.S. Pat. No. 3,833,916, granted on Sept. 3, 1974 to Jan Van Der Meer for *Photographic Camera Support*, in U.S. Pat. No. 3,821,771, granted on June 28, 1974 to Bruce K. Johnson and John M. Reynard for *Non-Folding Tripod Adapter*, in U.S. Pat. No. 3,800,312, granted on Mar. 26, 1974 to Edison R. Brandt for *Non-Folding Tripod Adapter*, and in U.S. Pat. No. 3,774,519, granted on Nov. 27, 1973 to Bruce K. Johnson for *Folding Tripod Adapter*. All of the above patents are assigned to the assignee of this application.

The adapters shown in these patents are provided with various means for securing the adapter to the camera. In U.S. Pat. No. 3,774,519, the securing means is formed as a hook driven by an eccentric pin on an actuator arm pivotally mounted in the adapter, the hook being engageable with an aperture formed in the base of the camera. In U.S. Pats. Nos. 3,800,312 and 3,821,771, wings are formed on the adapter and grasp the camera's housing to hold the adapter in place. In U.S. Pat. No. 3,833,916 there is shown an adapter comprising a flat plate which can be inserted into channels in the back of the camera. The object of this invention is to provide an improved adapter of rugged and reliable construction which easily can be attached to and detached from a camera.

Briefly, the above and other objects of the invention are attained by a novel tripod adapter construction comprising a housing in which there is securely mounted a threaded metal insert forming a tripod socket. A dovetail shoe is formed on the outside of the housing and is adapted to extend into a cooperating dovetail slot on the base of the camera. A camera having such a dovetail slot is shown, for example, in U.S. application Ser. No. 581,113, filed on May 27, 1975 by Bruce K. Johnson for *Photographic Camera Having External Power Supply*, and assigned to the assignee of this application.

In accordance with the invention, the dovetail shoe on the adapter housing is formed with an opening in which there is slidably received a lock slide assembly controlled by a manually operable locking arm. The lock slide assembly comprises a brake rail securing a combined spring and brake shoe assembly. In the locked position of the apparatus, the actuating arm holds the lock slide assembly firmly in a position in which the brake rail engages the edge of the dovetail slot on the camera base, against the action of the spring and with the brake shoes compressed into the side of the dovetail slot to create friction locking the assembly firmly in place.

The manner in which the apparatus of the invention is constructed, and its mode of operation, will best be understood in light of the following detailed description, together with the accompanying drawings, of a presently preferred embodiment thereof.

In the drawings,

FIG. 1 is a schematic three-quarter perspective sketch of an inverted camera, showing a dovetail slot in the base of the camera adapted for use with the adapter of the invention;

FIG. 2 is a schematic three-quarter perspective sketch of an adapter in accordance with the invention as seen from above;

FIG. 3 is a schematic bottom plan view of the adapter of FIG. 2;

FIG. 4 is a schematic top plan view of the adapter of FIG. 2, showing the actuating arm in its locking position;

FIG. 5 is a schematic plan view of the adapter of FIG. 2, showing the locking arm in its released position;

FIG. 6 is a schematic cross-sectional elevational view, on an enlarged scale, taken substantially along the lines 6—6 of FIG. 3 and showing the tripod socket insert;

FIG. 7 is a schematic plan view of the base plate forming part of the adapter of FIGS. 2, 3, 4 and 5, showing the tripod socket insert in place;

FIG. 8 is a schematic bottom view of the top cover of the housing of the adapter of FIGS. 2, 3, 4 and 5;

FIG. 9 is a schematic plan view of the top cover of the adapter of FIG. 2;

FIG. 10 is an elevational view of the apparatus of FIG. 7, taken substantially along the lines 10—10 in FIG. 7;

FIG. 11 is a fragmentary schematic cross-sectional elevational sketch of a portion of the apparatus of FIG. 7, taken substantially along the lines 11—11 of FIG. 7;

FIG. 12 is a fragmentary schematic cross-sectional elevational sketch of a portion of the apparatus of FIG. 7 on an enlarged scale, taken substantially along the lines 12—12 in FIG. 7;

FIG. 13 is a schematic cross-sectional view of the apparatus of FIG. 8, taken substantially along the lines 13—13 in FIG. 8;

FIG. 14 is a schematic elevational view of the apparatus of FIG. 9, taken substantially along the lines 14—14 in FIG. 9;

FIG. 15 is a schematic bottom plan view of the top cover of the apparatus of FIG. 2, showing the locking slide assembly in place and in the unlocked position;

FIG. 16 is a view corresponding to FIG. 15, but showing the lock slide assembly in its locked position;

FIG. 20 is a bottom plan view of a lock slide forming a part of the lock slide assembly of FIGS. 15 and 16;

FIG. 21 is a schematic cross-sectional elevational view of the apparatus of FIG. 20, taken substantially along the lines 21—21 in FIG. 20, and on an enlarged scale;

FIG. 22 is an end view of the lock slide of FIG. 20, taken substantially along the lines 22—22 in FIG. 20;

FIG. 23 is a front elevation of the apparatus of FIG. 20, taken substantially along the lines 23—23 in FIG. 20;

FIG. 24 is a top plan view of the lock slide of FIG. 20;

FIG. 25 is a top plan view of the lock slide assembly of FIG. 15;

FIG. 26 is a bottom plan view of a brake rail forming a portion of the lock slide assembly of FIG. 25;

FIG. 27 is an end view of the apparatus of FIG. 26, taken substantially along the lines 27—27 in FIG. 26;

FIG. 28 is a top plan view of the brake rail of FIG. 26;

FIG. 29 is a front elevation of the apparatus of FIG. 26, taken substantially along the lines 29—29 in FIG. 26;

FIG. 30 is an end view of the apparatus of FIG. 26, taken substantially along the lines 30—30 in FIG. 26;

FIG. 31 is a top plan view of a combined spring and brake shoe assembly forming a part of the lock slide assembly of FIG. 25;

FIG. 32 is a front elevational view of the apparatus of FIG. 31, taken substantially along the lines 32—32 in FIG. 31;

FIG. 33 is an end view of the apparatus of FIG. 31, taken substantially along the lines 33—33 of FIG. 31;

FIG. 34 is a schematic three-quarter perspective sketch of the lock arm forming a portion of the adapter of FIG. 2;

FIG. 35 is a plan view of the lock arm of FIG. 34;

FIG. 36 is a bottom plan view of the lock arm of FIG. 34;

FIG. 37 is an elevational view of the lock slide of FIGS. 34, 35 and 36, taken substantially along the lines 37—37 of FIG. 35;

Figure 39:
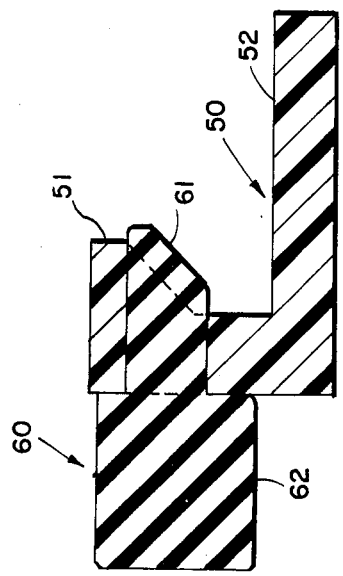
Figure 40:
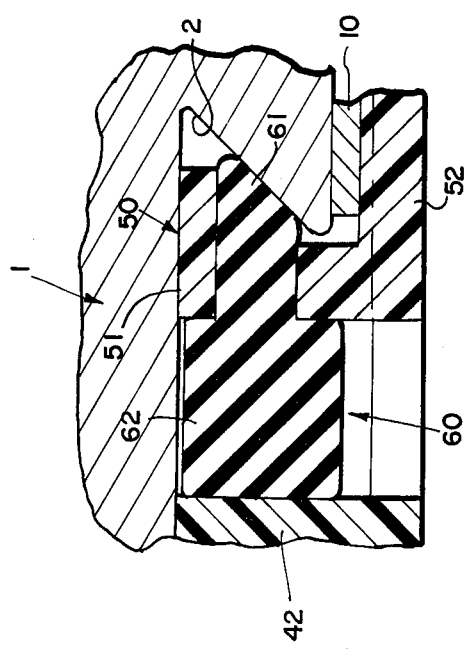

FIG. 39 is a cross-sectional fragmentary elevational view of the brake rail of FIG. 28 and the spring and brake shoes of FIG. 31, taken substantially along the lines 39—39 in FIG. 28 and 39—39 in FIG. 31, showing the brake shoe and brake rail assembly with the spring and brake shoes assembled on the brake rail; and FIG. 40 is a view corresponding to FIG. 39, but in addition showing portions of the camera of FIG. 1 to illustrate the operation of the spring and brake shoe assembly in the locked position.

FIG. 1 shows a camera generally designated 1, which may be of any conventional construction, except that it is preferably provided as shown with a tapered dovetail slot 2 in its base. The adapter in accordance with the invention is adapted to be secured to the camera through engagement with this dovetail slot 2 in a manner to be described.

FIG. 2 shows an adapter generally designated 3 in accordance with the invention. Comparing FIGS. 2 and 3, the adapter 3 comprises a housing formed of a top cover 10 and a base member 20 secured together by interfitting edge walls in a manner to be described below. A locking arm generally designated 30 is mounted in the housing for rotation between a fully locked position, shown in FIG. 4, and a fully released position, shown in FIG. 5. As shown, for example, in FIGS. 2, 9 and 14, the top cover 10 is formed with a dovetail shoe 11 having tapering edges 12 adapted to be received in the complementary dovetail slot 2 in the camera 1 of FIG. 1.

As shown in FIGS. 2, 5 and 10, for example, a generally D-shaped aperture 13 is formed through the top cover 10 and through a portion of the shoe 11. A lock slide assembly comprising a lock slide 40, a brake rail 50, and a combined spring and brake shoe assembly 60, all to be described in more detail below, is slidably received in the aperture 13 for movement between a braking position shown in FIG. 4 and a released position shown in FIG. 5. In other words, the element 11 forms a fixed portion of a dovetail shoe conforming to a portion of the slot 2, and the lock slide assembly comprises a movable portion of a dovetail shoe adapted to conform essentially to the balance of the slot 11.

As shown in FIGS. 3 and 6, a tripod socket is formed as a metal insert generally designated 70 formed with a threaded bore 71 to receive a standard tripod screw and a reduced cylindrical portion 72 to form a stop for the screw. A generally cylindrical portion 73 of the insert 70 is driven into a corresponding bore 21 in a boss 22 formed integral with the bottom wall 23 of the base member 20. A flange 73 on the inside of the insert 70 stops the insert from being pulled out of the boss 22 by the action of the screw and clamps the base member firmly to the tripod in use.

The top cover 10, base member 20, locking arm 30, lock slide 40 and brake rail 50 are preferably made of any suitable conventional synthetic molding resin, as by injection molding. Comparing FIGS. 7, 8, 10, 13 and 18, the top cover 10 is formed with side walls 14 adapted to fit around side wall portions 24 formed integral with the bottom wall 23 of the base member 20. Intermediate the wall segments 24 on the base 20 are hook elements 25, which are made in relatively short sections so as to be somewhat flexible, and are adapted to cooperate with hooks 15 formed on the inner sides of the side walls 14 of the top cover 10. By this arrangement, the apparatus can be snap fit together to complete the assembly of the adapter after the lock slide assembly and locking arm have been installed in the manner to be described.

Figure 17:
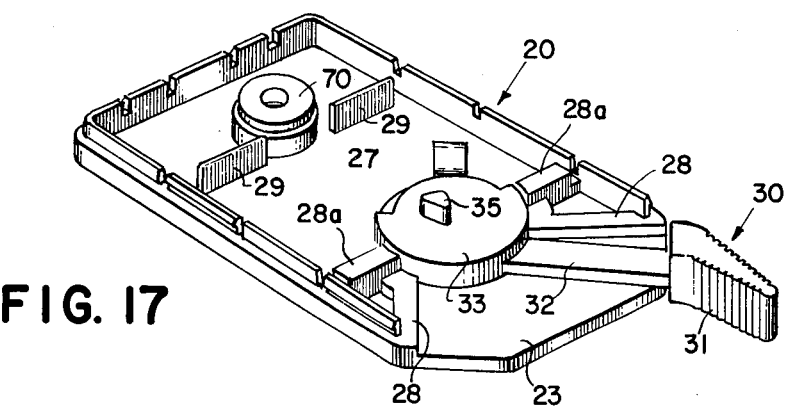
FIG. 17 is a schematic three-quarter perspective sketch of the base member of the adapter of FIG. 2, showing the lock arm in place.
Figure 18:
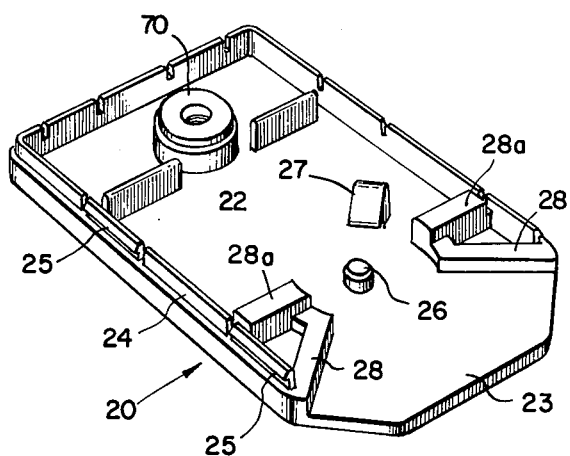
FIG. 18 is a view corresponding to FIG. 17, but without the lock arm.

FIGS. 34, 35, 36 and 37 show the locking arm 30. The locking arm comprises a thumb piece 31 connected over an actuating arm 32 to a hub portion 33. As shown in FIG. 36, the hub 33 is formed with a bore 34 adapted to receive a pivot pin 26 formed integral with the bottom wall 23 of the base member 20, as shown in FIGS. 7 and 18, for example. The locking arm is thereby journalled for rotation in the housing as indicated in FIG. 17. A cam 35 that is essentially triangular in plan is formed integral with the top of the hub 33 as indicated in FIGS. 34 and 35. The cam 35 functions to control the position of the lock slide assembly as will be described below.

An arcuate recessed ledge 36 is formed about a portion of the periphery of the hub 33 of the locking arm 30. This ledge is adapted to be slidably engaged by a guide piece 27 formed integral with the bottom wall 23 of the base 20 as shown in FIGS. 12, 17 and 18. The guide piece 27 serves as a load bearing to resist a twisting moment developed when the locking arm is under load.

Figure 19:
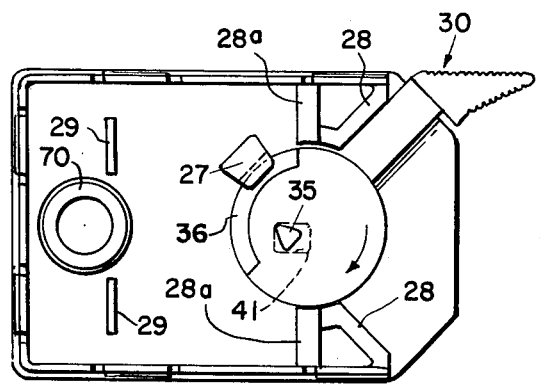
FIG. 19 is a plan view of the apparatus of FIG. 17.

Formed integrally with the bottom wall 23 of the base member 20 are shoulders 28 that serve to limit the angular travel of the locking arm 30, as suggested in FIGS. 17 and 19. Posts 28a formed integrally with the bottom wall 23 and extending above the shoulders 28 serve as guides for the lock slide assembly, as will appear.

Preferably, comparing FIGS. 8, 13 and 17, and referring to directions in the assembled adapter in its upright position, the top cover 10 is provided with downwardly extending stiffening tabs 16 adapted to fit alongside upwardly extending stiffening tabs 29 formed integral with the bottom wall 23 of the base member 20 to form a stiffening column for the housing.

As indicated in FIGS. 8, 15 and 16, a chamber for receiving the lock slide assembly is formed in the top cover 10 as a shallow well portion 17 surrounding the aperture 13 and abutted by outstanding ribs 18, one of which is shown in FIG. 13. Further outstanding ribs 19 are formed at one side of the well 17. The post 28a shown in FIG. 17 on the righthand side is adapted to fit between the ribs 19 and serve as a top guide for the lock slide assembly, as does the other rib 28a when it extends down on the other side of the well 17.

Referring to FIGS. 20 and 21, the lock slide 40 is formed on its bottom side with a generally rectangular recess 41. This recess is adapted to receive the cam 35 of the locking arm 30, as shown in FIG. 34. FIG. 19 shows the relationship between the recess 41 and the cam 35 in the released position of the locking arm 30. As there suggested, rotation of the locking arm 30 in the direction of the arrow will cause the cam to drive the lock slide upwardly (as seen in FIG. 19) relatively rapidly, and then to go over center with little further movement of the lock slide as the arm 30 goes over center towards its fully locked position.

Figure 38:
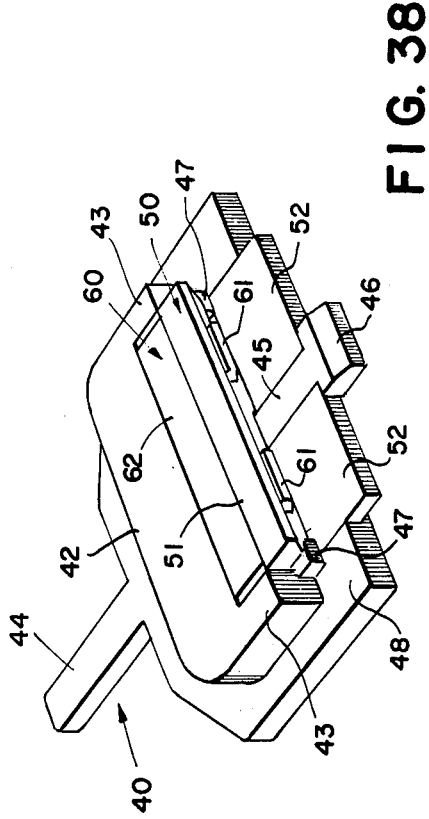
FIG. 38 is a schematic three-quarter perspective sketch, on an enlarged scale, of the lock slide assembly of FIG. 25.

Comparing FIGS. 21 and 24, the recess 41 is formed in a generally C-shaped portion 42 of the lock slide 40. As shown in FIG. 38, the portion 42 has arms 43 between which the spring and brake shoes and the brake rail are received in their assembled relationship.

As shown in FIG. 20 and elsewhere, the lock slide 40 is formed with a central guide arm 44 extending from one side of the base thereof, and with a second centrally extending arm 45 extending from the opposite side and terminating in an enlarged end 46. As shown in FIGS. 21, 23 and 24, a pair of opposed rails 47 are formed integral with arms 48 as a part of the base of the lock slide 40. These rails capture the brake rail spring and shoe assembly in a manner to be described.

FIGS. 26–30 show the brake rail 50. As there shown, the brake rail 50 comprises a rail section 51 joined to a pair of wing portions 52 by end posts 53 and a center post 54. As best shown in FIGS. 29 and 30, these elements define apertures 55 through which the brake shoe portions of the combined spring and brake shoe 60 are adapted to extend. These portions 61 are shown in FIGS. 31, 32 and 33. The spring and brake shoes 60 can be made of any suitable resilient material, such as natural or synthetic rubber or the like, preferably a high friction composition. The portion 62 of the unit 60 serves as a spring. The shoes 61 serve both to mount the spring on the brake rail and to act as brake shoes to provide a high friction engagement with the dovetail slot 2 in the camera 1 of FIG. 1.

FIG. 25 shows the lock slide 40 and brake rail 50 in assembled relationship without the spring and shoe piece 60. As indicated, the brake rail straddles the central arm 45 of the lock slide 40, with the wing portions 52 slidably engaging the undersides of the rails 47 and the rails 51 slidably engaging the upper sides of the rails 51, as seen in FIG. 25. Rail 50 is then trapped by the enlarged piece 46 for movement between the position shown in FIG. 25 and a position to the left in FIG. 25. To enable the assembly of the parts in this manner, the brake rail 50 should be molded of plastic of sufficient flexibility to permit a slight flexing of the wings 52 to initially get the piece into its captured sliding position.

In the actual assembly of the parts, the brake shoes 61 of the piece 60 are inserted in the recesses 55 in the brake rail 50 before the brake rail is installed in the manner shown in FIG. 25. The assembled relationship is shown in FIGS. 38, 15 and 16.

To complete the assembly of the adapter when the lock slide assembly has been completed in the manner just described, the locking arm 30 may be placed on the base member 20 in the manner shown in FIG. 17. The lock slide assembly is then placed over the locking arm with the recess 41 in engagement with the cam 35 in the relative position suggested in FIG. 19. The top cover 10 is then installed. The position of the lock slide assembly relative to the top cover will be as seen in FIG. 15 if the parts are assembled with the locking arm 30 in the position shown in FIG. 19.

The top cover 10 is now snapped down over the base member 20 and the assembly is completed.

The completed adapter may be installed on the camera by slipping the shoe 11 into the dovetail slot 2 with the locking arm 30 in the position shown in FIG. 2. The arm 30 is then swung over to the locking position shown in FIG. 4, firmly attaching the adapter to the camera with the locking arm in a position flush with the wall of the camera as suggested in FIG. 4.

In the locked position, the movable shoe portion comprising the lock slide assembly is urged away from the fixed shoe portion 11, exerting a clamping force against opposite edges of the dovetail slot 2. FIG. 40 shows the operation of the brake assembly with the adapter installed on the camera. As shown, the brake shoes 61 are compressed from their relaxed position shown in FIG. 39, and the spring portion 62 urges the brake shoes into engagement with one side of the groove 2 in the camera, and the shoe 11 into engagement with the other side of the groove 2.

While the invention has been described with respect to the details of a particular embodiment thereof, many changes and variations will occur to those skilled in the art upon reading this description. Such can obviously be made without departing from the scope of the invention.

Having thus described the invention, what is claimed is:

1. An adapter for securing a photographic accessory having a tripod screw to a camera having a dovetail slot, comprising a housing, means forming a tripod socket in said housing, a dovetail shoe mounted on said housing and adapted to extend into the dovetail slot in the camera, means forming an aperture in one side of said dovetail shoe, a lock slide, means mounting said lock slide in said aperture for movement between a first position within the confines of said dovetail shoe and a second position beyond the confines of said shoe, a resilient element mounted on said lock slide in position to engage the dovetail slot in said second position of said lock slide, and cam means for moving said lock slide between said first and second positions.

2. An adapter for releasably coupling a camera accessory to a camera of the type including a dovetail slot having first and second side portions, said adapter comprising:

an adapter housing;
a camera accessory mounted on said adapter housing;
a dovetail shoe on said adapter housing having first and second side portions and being configured to extend into the dovetail slot of the camera with said first and second side portions of said shoe in engagement, respectively, with the first and second side portions of the dovetail slot such that said shoe is coupled to the dovetail slot for sliding movement relative thereto;

brake means, including resilient means, mounted on said shoe for movement relative thereto between a first position wherein said brake means is located within the confines of said shoe so as to not engage either one of the first and second side portions of the dovetail slot when said shoe extends thereinto thereby allowing sliding movement of said shoe relative to said slot and a second position wherein at least said resilient means of said brake means extends outwardly beyond the confines of said shoe when said shoe is in the slot for engaging at least one of said first and second side portions of the slot and providing a frictional force that effectively inhibits sliding movement of said shoe relative to the slot; and means actuable for effecting the movement of said brake means between said first and second positions.

3. An adapter as defined in claim 2 wherein the dovetail slot of the camera is tapered and said shoe is tapered in a manner to conform to the tapered slot.

4. An adapter as defined in claim 2 wherein said camera accessory includes a tripod socket.

* * * * *